Feb. 5, 1952   S. T. GROSS   2,584,962
SERIES X-RAY CAMERA
Filed Jan. 22, 1947   3 Sheets-Sheet 1

INVENTOR
SIEGFRIED T. GROSS
BY
ATTORNEYS

Feb. 5, 1952 S. T. GROSS 2,584,962
SERIES X-RAY CAMERA
Filed Jan. 22, 1947 3 Sheets-Sheet 2

INVENTOR
SIEGFRIED T. GROSS
ATTORNEYS

Patented Feb. 5, 1952

2,584,962

UNITED STATES PATENT OFFICE 2,584,962

SERIES X-RAY CAMERA

Siegfried Theodore Gross, Easton, Pa., assignor to General Aniline & Film Corporation, New York, N. Y., a corporation of Delaware Application January 22, 1947, Serial No. 723,646

11 Claims. (Cl. 250—53)

This invention relates to X-ray cameras, and more particularly to cameras for making X-ray diffraction pattern photographs.

It is a general object of the invention to devise an X-ray camera which shall make possible a great saving of time in photographing diffraction patterns and the like, with uniformity and accuracy of results.

Among the specific objects of the invention is that of devising an X-ray camera for making diffraction patterns of various materials and which shall serve to expose a plurality of adjacent, independent patterns or X-ray images in strip form on a single film.

Another object of the invention is to provide an X-ray camera which shall be compact and easily operated and in which a specimen, the diffraction pattern of which is to be determined, may be quickly inserted to a precise position so that a collimated X-ray beam may pass through the specimen to be diffracted thereby without being screened or absorbed by any of the adjacent parts of the mechanism.

Another object of the invention is that of devising an X-ray camera in which the specimen to be X-rayed may be readily inserted, and wherein a shutter is provided by means of which the X-ray beam shall automatically be blocked from passing whenever the specimen holder is withdrawn.

Another object of the invention is that of devising a series type of X-ray camera in which the film holding member may be easily loaded with X-ray film in daylight.

A further object is to provide a film holder permitting the light-protected film to be held over an aperture in the camera body so that X rays may reach a prescribed area only of the film, and so that both the holder and the film serve to confine the X rays within the interior of the camera body.

Another object of the invention is that of providing for movement of the film along the camera body and past the aperture through which rays reach the film so that a number of correlated, parallel, strip-like, independent exposures may be made on a single film.

Another object of the invention is to provide automatically movable means within which the specimen holder is inserted so that the specimen may be oscillated throughout a predetermined and limited angular extent relatively to the collimated beam during exposure.

It is a further object of the invention to increase the speed of making X-ray diffraction patterns by collimating the X-ray beam in a manner to give a very intense divergent central beam.

Another object of the invention is that of devising an X-ray camera with which a plurality of exposures may be effected in series and by which the film may be advanced from one exposure area to the next automatically and in a predetermined timed relationship.

Other objects of the invention will become apparent from the following disclosure.

X-ray cameras have been available for making radiographs of different materials to obtain diffraction patterns for various purposes. The camera herein described and claimed may be employed for making routine powder analyses by the X-ray diffraction method, may be used to identify crystalline powders, to compare samples or to estimate particle size. It may also be employed to determine whether a sample is glass or whether it is of crystalline nature.

It is of decided advantage to make a series of exposures on a single sheet of film since the time required to load one large sheet is not greatly different from that required to load a smaller sheet and, obviously, employment of separate films to obtain eight or ten patterns of a sample consumes a great deal more time than is necessary if the same number of exposures can readily be made on a single sheet. The camera herein described has been designed with a view to making a series of exposures by moving the body of the camera and the film holding member attached thereto relatively to one another so that a single sheet of film may be employed to obtain a relatively great number of exposures. It is not practicable to have a very great number of film holders or cassettes and if film must be loaded or holders changed between each exposure, it does add materially to the time required to make a plurality of routine exposures.

While the time saved in loading one instead of several films is appreciable, it is a decided advantage to be able to develop and otherwise process a single sheet of film having thereon a number of exposures, all of which pertain to a single specimen or a single test, and the saving of time in handling the single sheet, while appreciable, is perhaps not so important as the uniformity of treatment each of the exposures must receive if processed on a single film.

A series of radiographs such as diffraction patterns on a single film are more accurately and more expeditiously measured and compared than they could be if on a number of separate films.

All advantages which apply to the series of patterns on a single film apply as well to prints or reproductions from the original film. The saving in time in printing and filing is greatly to be desired.

According to one form of the invention, a camera casing or body is provided with a collimating tube through which X rays are permitted to enter the camera and by means of which the camera may be attached to and held in position relative to a source of X rays. The collimating tube is directed toward a more or less centrally disposed member slotted or otherwise provided for insertion of a specimen retaining strip or bar. The specimens may be of any desired type, such as powdered materials or crystalline structures, and are packed or otherwise inserted in an opening in the specimen holder which is so located that, when the holder is inserted to its full depth, the specimen will occupy a position in the center of the camera and in the beam emitted from the collimating tube so as to diffract the rays of the beam.

The camera body has an opening or aperture through which the diffracted rays may pass to reach the film. The body itself is a partial cylinder accurately concentric with the center through the specimen. Diffracted rays from the specimen pass through this aperture to the film which is likewise cylindrically disposed about the same center and is held by a film retaining member slidable or otherwise movable relatively to the camera body. The film retaining member slides along the camera body in suitable guide means, and the dimensions and the general shape of the parts are such, as will hereinafter be described, that the film overlies the aperture in the camera body and effectively closes off the aperture so that the X rays are confined within the camera body. For most practical purposes, the film retaining member may be eight or ten times longer than the width of the aperture which determines the width of one exposure, so that by suitably graduating the film retaining member and providing an index mark at an appropriate adjacent part of the camera, the film may be manually or otherwise moved from one exposure to the next. Since exposures are relatively long as compared to the time required to move the parts, the effects of movement between exposures may be neglected.

The diffracted rays may be permitted to expose the film throughout any desired angular extent, but as herein illustrated, the exposure extends over an arc of roughly 180°. The central or undiffracted rays are not permitted to strike the film and are blocked off by an absorbing means at that part of the aperture, said absorbing means being suitably opaque to the X rays employed.

In order to render the camera safe, to protect the operator, and to prevent unintentional exposures when the film is in place, an automatically functioning shutter always closes the aperture through which the beam strikes the specimen except when the specimen holder is pushed into position. This permits removal of the film holding member while the camera is attached to an active X-ray source without the danger of X rays passing outwardly through the exposure aperture.

According to a modified form of the invention, the specimen may be oscillated to and fro periodically or may be given a single oscillation during an exposure. Such oscillatory movement of the specimen may be through any desired angular extent, but for normal purposes an angular movement of about 10° has been found satisfactory. To accomplish this, the receiver for the specimen holder is mounted in a rotary member set in the side of the camera body, and by a cam engagement with a projecting part of said rotary member, the desired oscillatory movement is effected. The oscillation may be produced by a fractional horsepower electric motor or by any other suitable power means.

Another modification hereinafter to be described in detail provides for automatic movement of the film at predetermined periods so that a total number of exposures permissible is made without attendance by an operator other than to load the film, the specimen or specimens, and to start the mechanism in operation. Automatic actuation may be applied to the production of X-ray patterns where the series comprises diffraction patterns of a single specimen under different conditions or of a plurality of different specimens under the same or other prescribed conditions. According to one preferred form which this modification may take, the film holder also carries an elongated specimen holder having provision for a plurality of specimens at intervals equal to the interval between adjacent exposed areas or patterns. The film holder is mounted for free movement relatively to the camera body and also has a rack engageable by a pawl or claw actuated in one direction by a solenoid and in the other by a spring.

The solenoid is energized from a suitable source of current and timing of the movement from one exposure to the next is controlled by a reversing switch which is in turn actuated by a driven timer having adjustably fixed timing contacts engageable with the reversing switch. The timer carrying the said contacts is rotated at a very slow speed by a reversible synchronous motor controlled by the switch which also controls the energizing and deenergizing of the solenoid itself.

The invention will be described in greater detail by reference to the accompanying figures of drawing wherein the same numerals are applied to corresponding parts in the figures, wherein.

Now referring to Figs. 1–4, the camera comprises a body portion which includes the side walls 10, 11, an anterior wall 12 and a cylindrically shaped posterior wall 13 coextensive with the peripheries of the sides 10 and 11. The wall 13 is slotted for about 180° of its extent leaving a peripheral, rectangular opening or aperture 14 through which X rays reach the film. The front wall 12 has a centrally disposed aperture within which a collimating tube 15 is retained by a threaded collar 16 tightened in position by the nut 17. This collimating tube may take various forms and, generally speaking, is for the purpose of controlling and conducting or permitting the entry of the X rays to the interior of the camera. It also serves to limit the beam to a particular area within the camera as will hereinafter be more clearly explained. The collimating tube has at its outer or forward end a tapered portion 18 by means of which it may be attached to a source of X rays. If the camera is of smaller type, the connection through the collimating tube to the source of X rays may be sufficient to support the mechanism, but in other situations, the camera body and, thus the weight of the entire mechanism may be suitably supported on a base or stand.

Figures 1, 10:
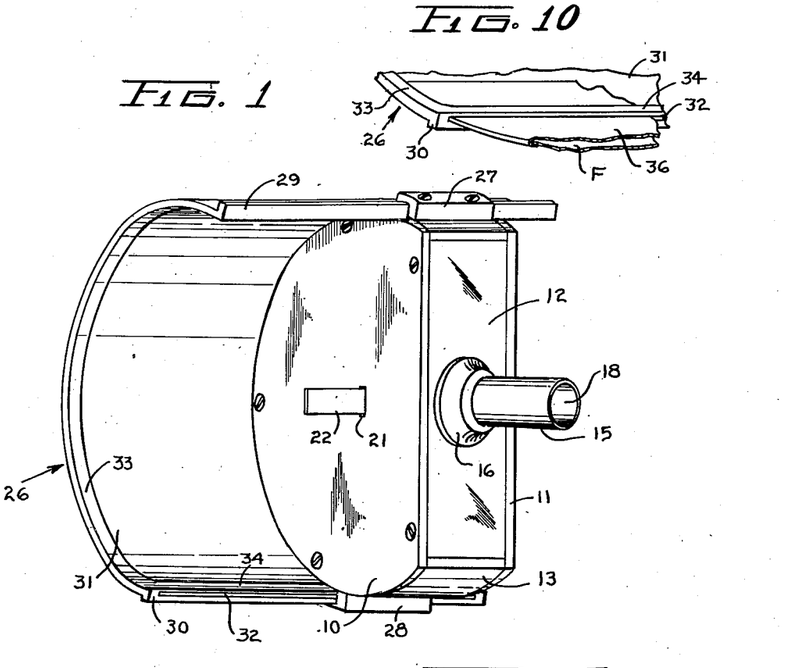
Fig. 1 is an isometric view showing one preferred form the camera may take.
Fig. 10 is a perspective view of a fragmentary part of the film holder showing the manner in which a light protected film is inserted.
Figures 2, 3, 4, 5:
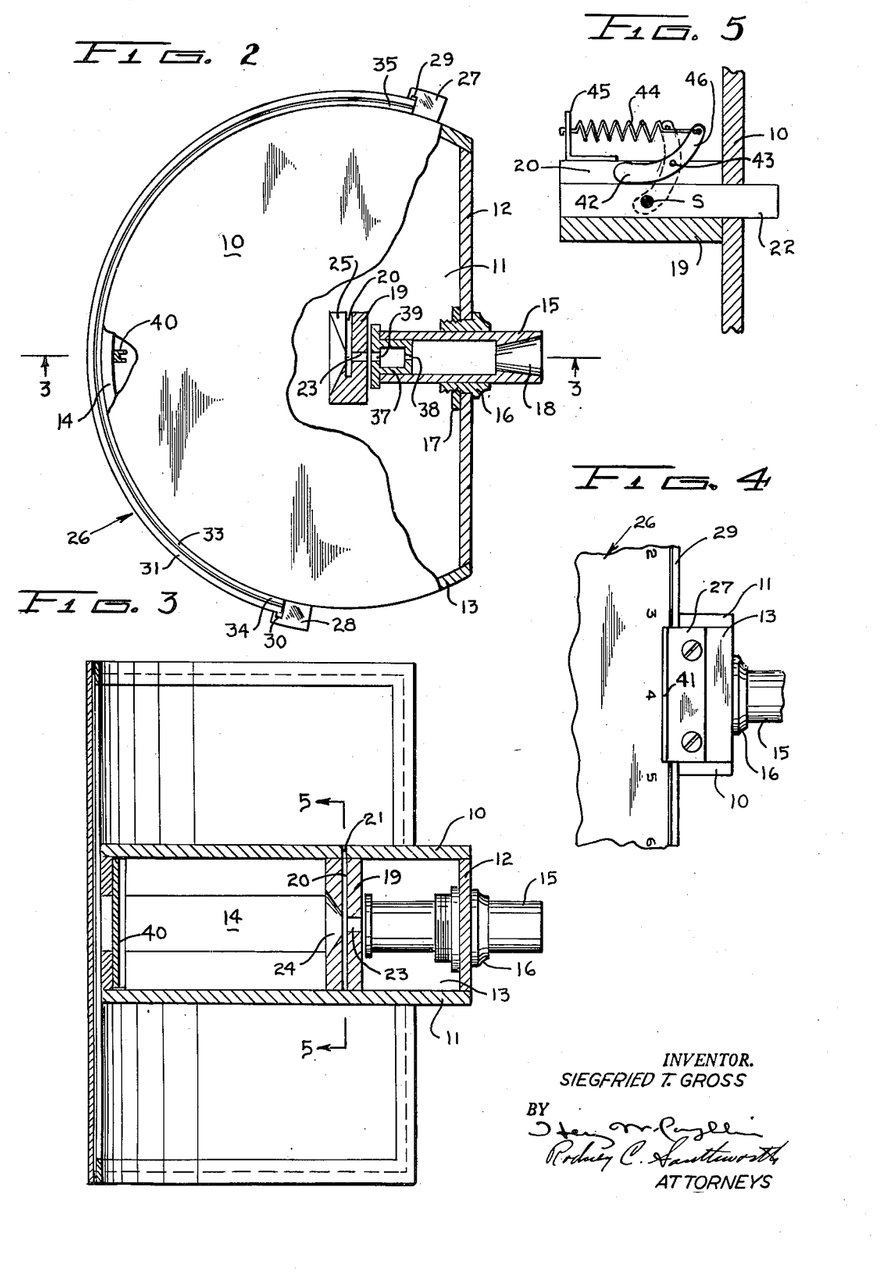
Fig. 2 is a partial vertical section along the optical center of the camera of Fig. 1.
Fig. 3 is a horizontal section taken through the center of the camera of Fig. 1 or 2 as indicated by the arrows 3—3, Fig. 2.
Fig. 4 is a top view of part of the camera showing the indexing marks by which the different exposures are set.
Fig. 5 is a section showing certain details at the line 5—5, Fig. 3.

Centrally of the camera casing is provided a receiver for a specimen holder, this receiver taking the form of a rectangular block 19 having a slot 20. This block is attached by means of screws of other suitable connecting means to the side wall 10 of the casing and is of just sufficient length to extend across and abut against the opposite side of the casing. A rectangular opening 21 is cut in the side wall 10 and communicates with the slot 20 so that a specimen holder 22 may be pushed in through the rectangular opening to interpose a specimen in the X-ray beam. The specimen receiving member 19 has an opening or aperture 23 appreciably larger than the X-ray beam at that point so that as the X rays pass through the specimen, they are not absorbed or screened by any portion of either the holder 22 or the specimen receiver 19.

Figures 8, 9:
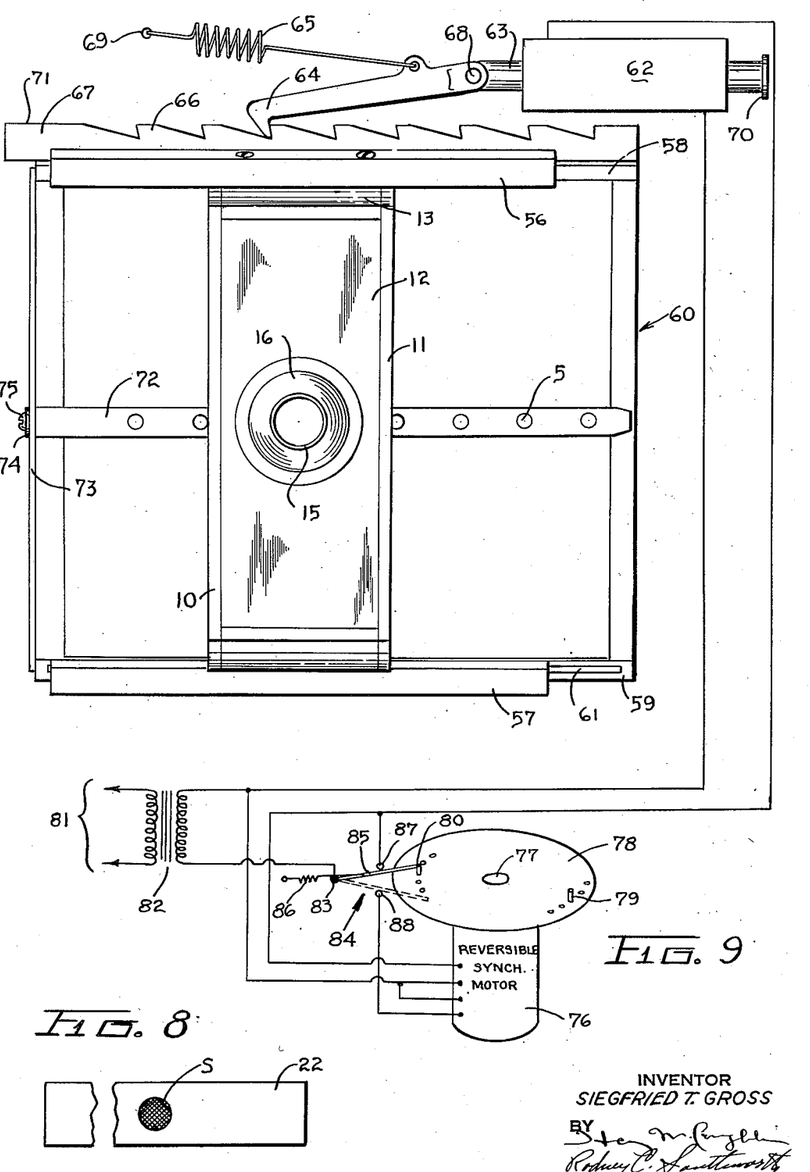
Fig. 8 shows in detail one of the specimen retaining holders.
Fig. 9 is a combined front view of the camera and diagrammatic view of the automatic controlling circuit of one modified form the invention may take.

Now referring to Fig. 8, the specimen holder 22, shown enlarged in this view in proportion to similar parts in the other figures, merely comprises a strip or bar of rectangular cross-section and of sufficient length to be projected inwardly until it stops against the inner face of the side wall 11 while enough of the opposite end remains outside the camera casing to be readily gripped by the technician or other operator. This holder 22 is drilled at a point to align with the aperture 23 when the holder is pushed inwardly to its fullest extent. The specimen S is packed into or otherwise inserted into the drilled opening and really forms a disk of the material through which the X rays pass and by which they are diffracted in accordance with the characteristics of the specimen itself. For analysis of different materials, the said materials are reduced to powdered form and are pressed into the aperture or opening which, for a camera of about the size herein illustrated, may be about ⅛ inch in diameter. After the X rays have been diffracted upon penetration of the specimen when it is inserted within the beam, the diffracted rays pass at their different angles toward the peripheral, rectangular aperture 14 to form a latent image on the emulsion of the X-ray film. The receiving member 19 is countersunk as at 24 to permit the angularly emitted rays to move toward the aperture 14 without contacting any physical portion of the receiver. At the top of the receiving member 19, the countersunk portion is discontinued since a vertically disposed parallel slot 25 permits rays to pass up to an angle of 90° from the horizontal.

A film holder generally designated by numeral 26 is of cylindrical shape and extends for about 180° around the curved portion of the camera casing. It slides laterally within guides 27 and 28. At the top, a rib or spline 29 is slidable within a cooperating groove in the guide 27 which is securely attached to the camera body or casing, while at the bottom, a similar spline 30 slides within a groove in the guide 28. The holder further comprises an outer shell portion 31 within which is held the film inserted through an elongated slot 32. Of course, the film holder is withdrawn from the guides when the film is loaded. A plurality of film holders may be provided for each camera so that loaded holders may always be available. This speeds up the making of diffraction patterns, especially in routine work, although it takes but a very few seconds to withdraw an exposed film from the holder and to reload it preparatory for reinsertion in the camera.

The film is held in position in the holder by the inwardly directed lips 33, one at either side, a retaining strip 34 at the loading slot 32 adjacent the bottom of the film holder and a similar lip 35 at the top. The dimensions of the space formed between the shell 31, the lips 33, 35, and the strip 34 are such that a standard sheet of X-ray film enclosed within the usual light-tight wrapping may be inserted without difficulty. The light excluding protective paper about the film permits it to be loaded in open daylight and to be handled at will without fear of fogging by light from the visible or near visible spectrum.

When the film holder 26 has been loaded, it is pushed into position after engaging the splines 29 and 30 within the guides 27 and 28. When moved to a position to overlie the aperture 14, the film, or the protective paper thereon, will sufficiently close off the rear portion of the camera casing so that X rays may pass through the said aperture 14 to the film, but may not pass farther to constitute a source of danger.

In Fig. 10, a fragmentary portion of the holder 26 is shown having the leading edge of a film F, sheathed in light-tight protective paper 36, pushed inwardly through the loading slot 32.

While the beam is collimated by the tube 15, tapered as described at 18, a further attenuation of the beam and thus more precise control thereof is brought about by an insert 37 frictionally or otherwise retained within the inner end of the tube 15. This insert has a pin hole or, more preferably, a slit 38, through which the beam passes and by which it is attenuated prior to penetrating the specimen. A second slit 39 permits the central collimated beam only to pass and to reach the specimen through the slit 23, thus cutting out any rays diffracted by the edges of slit 38.

A channel or trough 40 is permanently positioned at the horizontal center line and across the aperture 14 in direct alignment with the central portion, that is, the undiffracted part of the beam. This channel 40 is of material opaque to the X rays to be employed and absorbs the undiffracted part of the beam thereby to prevent fogging of the central portion of the pattern.

An index mark 41 at the center of the guide member 27 serves in cooperation with a series of numerals at the upper edge of the holder 26 to center the film for each separate exposure and to indicate that particular exposure for which the film is at any time set. The numbers run from one to eight or any other maximum number of exposures for which the holder 26 may be provided. The spacing between numbers depends upon the width of the strips independently exposed upon the film and each of which constitutes an independent X-ray diffraction pattern.

Now referring to Fig. 5, a shutter 42 is pivoted at 43 within the slot 20 and may be swung downwardly to the dotted-line position in which it completely closes off the opening or aperture 23 through which the X rays must pass before they reach the specimen S or before passing into the interior of the camera body. A spring 44 is fixed at one end to a small bracket 45 attached at the top of the slotted receiver 19 and at its other end is connected to the upwardly projecting portion 46 of the shutter. Whenever the holder 22 and the specimen carried thereby are withdrawn from the camera, the shutter will automatically, due to the tension in spring 44, move to the dotted-line position thereby to close off the opening 23 and to prevent passage of the X rays. Whenever a specimen is inserted in the beam by pushing the holder 22 inwardly until it contacts the opposite side of the camera casing, the shutter will automatically ride up on the holder thereby permitting the X rays to pass and to penetrate the specimen.

This shutter protects films and the operator since whenever the film holder 26 is removed from the camera, the shutter 42 may first be closed by withdrawing the specimen holder. Thus, X rays are not permitted to pass outwardly through the aperture 14 even though the camera remains coupled to an active source of radiant energy. Whenever a film is moved to exposure position, fogging of the film is prevented by the shutter until the holder 22 with its specimen is inserted at which time the actual exposure is intended to be started.

The shutter 42 is made of any suitable material opaque to X rays or to the particular radiant energy employed, for example, it may be made of lead or lead alloy or may be made of iron if the X rays employed are of the Cu K α type. In some instances, the shutter may be of laminated construction, for example, a lead core sheathed by brass or other material more suited to withstand continuous usage, but providing the lead for absorbing the X rays themselves.

The camera body including the side walls 10 and 11, anterior wall 12, and posterior wall 13, also the shell 31 of the holder, are made of material which is relatively opaque to the X rays employed, and also, these parts are of such material, or are interiorly coated or faced with a material which will minimize secondary radiation and which will also minimize scattering of radiation. The insert 37 and also the specimen receiver 19 are of material opaque to X rays, or at least have such relative opacity to the X rays used that the beam which eventually strikes the specimen is that defined by the slit 38.

Figure 6:
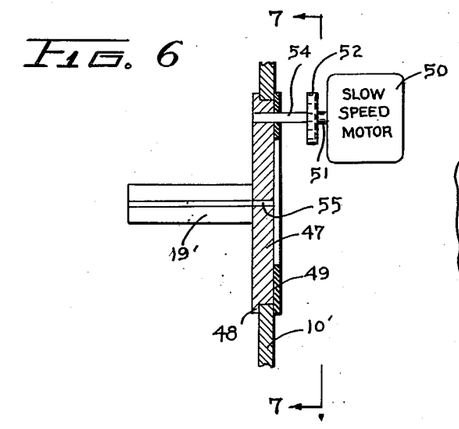
Fig. 6 is a sectional view of a modified form of the camera in which the specimen is given an oscillatory movement during exposure.
Figure 7:
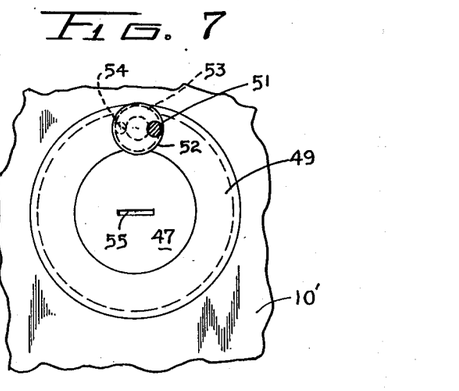
Fig. 7 is a partial section taken at line 7—7, Fig. 6.

Now referring to Figs. 6 and 7, the invention as described heretofore may be modified by providing for an oscillation of the specimen within the X-ray beam. For obtaining certain patterns, such movement is desired. As shown in Figs. 6 and 7, the side wall 10' of the camera body is bored to form a bearing for a disk 47 having a flange 48 and held in operative position by a detachable flange 49 at the opposite side. A groove formed between the flanges 48 and 49 completes the bearing and retains disk 47 in proper relationship with respect to the side wall 10'. The fit between these parts is such that the disk may be rotated with relative ease, but without any play or unintended movement which would cause vibration of the specimen within the beam.

A specimen receiver 19' like that described with respect to the first form of the invention and having a slot, shutter, etc. is fixed to the disk 47 so that the specimen will be perpendicular to the direction of the main beam when the oscillating disk 47 and its attached receiver 19' are at the midpoint of their oscillatory movement.

While any convenient means may be employed for oscillating the disk, that herein disclosed includes a slow speed motor 50 to the shaft 51 of which is fixed a cam 52 having therein a cam slot 53 within which engages the end of a pin 54 projecting from the disk 47. As the cam 52 is rotated by the motor, the cam slot 53 causes pin 54 to move throughout an arc depending upon the eccentricity of the slot. The speed of the motor may be regulated to give one complete oscillation of the specimen for each single exposure or, if desired, may give any number of oscillations during an exposure. The cam slot itself while herein shown as one adapted to impart a simple harmonic motion may be modified to give any motion required, for example, a uniform movement such as would be imparted by the well-known heart-shaped cam. Instead of employing a cam adapted to control the pin 54 at all times, other types of cams may be used in which event a spring may move the parts in one direction while the cam moves then in the opposite.

The disk 47 has an opening 55 for the reception of the specimen holder. The holder is inserted in the same way as the holder 22 was inserted in the opening 21, Figs. 1 and 3.

Now referring to Fig. 9, another modification of the invention provides for automatically moving the film holder between exposures and for automatically timing the individual exposures. The basic parts of the camera are identical with or are at least similar to the basic parts of the camera described and illustrated in Figs. 1, 2 and 3. These parts are correspondingly numbered in this Fig. 9 and the first distinction is to be found in the elongated guide members 56 and 57 which correspond to the guide members 27 and 28, but are much longer and provide a more complete bearing for the sliding splines 58 and 59 similar to splines 29 and 30, Fig. 1. The film holder generally indicated by numeral 60 is otherwise similar to the holder 26 and has a loading slot 61 through which the film is inserted just as described heretofore.

In some instances, it is desirable to make a number of adjacent, strip-like patterns from a single specimen. In this event, a holder similar to the holder 22 is inserted in the camera body as in Fig. 1, and the exposures are automatically made, the number thereof depending upon the length of the film to be accommodated in the holder 60 and the width of each independently exposed area on that film. In other instances, a plurality of patterns may be adjacent positioned on a single sheet of film, each of these patterns being identified with a separate specimen, the number of specimens therefore being equal to the number of exposures, considering one film sheet and one specimen holder.

For periodically moving the film holder 60, a solenoid 62 having an armature or plunger 63 is energized to move a claw 64 against the tension of a spring 65 a distance equal to the space between teeth 66 on the rack 67. The rack 67 is attached at the top or any other convenient part of the holder 60 and the space between teeth 66 is equal to the space between centers on adjacent exposed areas of the film. The claw 64 is pivoted at 68 and the spring 65 attached at one end to the claw and at its opposite end to any fixed anchor 69 moves the claw and plunger to the left until stopped by the collar 70 on the plunger thereby to engage the next tooth in the rack. Movement in the other direction, that is, when the solenoid is energized, is stopped by contact of the hinge portion of the claw pivoted at 68 so that each movement of the mechanism to bring an unexposed film area into alignment with the aperture 14 will be definitely limited and thereby the spacing of the exposed areas or patterns maintained at some predetermined dimension. The rack 67 is extended to the left and the flat portion 71 permits the claw to continue functioning without advancing the film holder past the last intended exposure.

In the event a plurality of specimens are to be provided, one for each separately exposed area or pattern, an elongated strip or bar 72 is attached to a plate 73 fixed at the left hand end of the film holder 60 and preferably quickly detachable therefrom. Here the strip 72 is angularly bent as at 74 and projects through a hole in the plate 73 and in alignment with the opening 21 in the camera side wall 10. A screw 75 may be employed for holding the specimen holder in operative relationship to the plate 73 and permits quick detachment therefrom. A number of specimens S are equally spaced along the strip 72 and these specimens are preferably prepared and inserted in the strip just as described with respect to the specimen holder 22, Fig. 2. Each of the specimens, when the mechanism has been assembled is in alignment with the center of a rectangular area on the film held in the film holder and intended to be exposed or to receive as a latent image the pattern particular to that specimen. Obviously, the specimens S may all be different or may be like specimens of the same material.

For controlling the interval of exposure and for moving the film and specimens at the completion of each exposure, a reversible type synchronous motor 76 has fixed for rotation on the motor shaft 77 a disk or other timing member 78. This disk is provided with a relatively great number of indexed holes (some only of which are shown) and in which may be inserted timing pins 79 and 80. The synchronous motor is preferably of a type to rotate at a very slow rate, for example, to make one complete revolution in a period of several minutes. The speed may depend upon the radiation employed and the maximum length of exposure contemplated.

Current from any suitable source 81 is transformed, if necessary, by a transformer 82 and is conducted from the secondary of the transformer to the solenoid 62 and also to one terminal 83 of a switch generally indicated by numeral 84 and of the toggle type having a current carrying switch member 85 pivoted at the terminal 83 and held in position in either of two opposed positions by a tension spring 86. When in one position, as shown in Fig. 9, the member 85 is in contact with a switch terminal 87 connected both to the solenoid and also to one terminal of the motor 76. In its opposite position the member 85 contacts a third switch terminal 88 connected only with the motor 76. The conductor from the transformer secondary to the solenoid is also connected to the remaining two terminals of the synchronous motor and by means of the circuit herein illustrated and described, the film and specimens may automatically be moved at predetermined timed intervals set by properly spacing the pins 79 and 80 in the timing disk 78. In the position in which the parts are illustrated in Fig. 9, the reversible motor has just rotated the disk 78 so that the pin 80 has contacted switch toggle 85 throwing it into contact with terminal 87. This serves to reverse the polarity of the motor and thereby start rotation of disk 78 in the opposite or counterclockwise direction and also completes a circuit from the transformer secondary through the switch to the solenoid 62 which has been illustrated about one-half way through its movement from left to right to advance the film as above described. The claw will be stopped upon contact of the hinge portion thereof with the left end of the solenoid case, but it is to be understood that the reverse movement under the influence of the spring 65 provides an excess of movement so as to make certain of engaging another tooth each time, although there is no possibility of engaging an unintended tooth.

The pin 79 is so set that after the disk has rotated for one-half the time of the desired exposure, it will trip the toggle 85 to the dotted-line position thereby deenergizing the solenoid and reversing the motor 76. It will take an equivalent amount of time then under clockwise rotation of the parts for the pin 80 to again trip the switch to effect movement of film and specimen. In the meantime, of course, spring 65 will have brought about the engagement of the next rack tooth by the claw 64.

While the same has not been illustrated in Fig. 9, the oscillating mechanisms of Figs. 6 and 7 obviously can be incorporated along with the automatic film advance and is intended to be so employed if desired.

As constructed and described in the paragraphs pertaining to Fig. 9, the camera is intended to be started by an operator and after termination of the last exposure, the operator may lift the claw 64 and withdraw the film and specimens. If the exposure is relatively long, it is not necessary to disconnect the source of radiant energy since the shutter will close off the rays from the body of the camera once the strip 72 is withdrawn. It may be desired to render the operation still more automatic, in which event, the last exposure, when terminated, may cause an idle movement of the solenoid and claw 64 to trip a switch or other controlling mechanism thereby to shut off the X-ray beam or in some other manner to discontinue the exposure thereby making it unnecessary for an attendant to be present at that moment.

While one preferred embodiment and certain modifications have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. An X-ray diffraction camera having in combination, a radiation confining body, means for permitting X rays to enter said camera body and for collimating said rays to form a beam of definite, predetermined cross-section, a holder for a specimen and a receiving means in said camera body for permitting insertion of said holder and specimen so positioned that upon insertion of the holder to its fullest extent, the specimen therein shall be positioned within the collimated X-ray beam, an aperture in said camera body opposite the X-ray collimating means through which X rays diffracted by the specimen may pass, and a film retaining member for closing off said aperture when in active position with respect to said camera body, said member having splines adjacent its extremities, guide means for said splines on said camera body, said member being several times longer than the width of the aperture through which the diffracted X rays pass thereby to permit a number of independent, strip-like, adjacent exposures to be made on a single sheet of film by moving the said member relatively to the camera body after each independent exposure, an index mark relatively fixed with respect to the camera body and a plurality of graduations on said film retaining member and cooperating with said index mark, said graduations being spaced the distance between centers of adjacent exposures.

2. An X-ray diffraction camera comprising, a radiation confining body, having the general shape of a partial cylinder, collimator means for conducting X rays from the source to the interior of said camera body and for defining a beam of said rays of definite cross-section, a holder for a specimen and means permitting insertion of said holder and specimen and for maintaining them centrally of the camera body and in such position that the X-ray beam emitted from the collimator shall pass through the specimen in said holder to be diffracted thereby, an aperture in said camera body opposite the X-ray collimator and having the shape of a rectangular, partial cylinder through which the diffracted X rays may pass and a film retaining member for closing off said aperture having means to permit insertion of a light-protected X-ray film and guide means for retaining said protected film in said member to be moved therewith and to overlie the camera body aperture when said film retaining member is in operative position with respect to said camera body, means on which said film retaining member may be moved relatively to said camera body, said member being several times longer than the width of the aperture through which the diffracted rays pass thereby to permit a number of independent, strip-like, adjacent exposures to be made on a single sheet of film by moving the said member relatively to the camera body after each independent exposure and means for automatically blocking off the X-ray beam whenever the specimen holder is withdrawn from the means for maintaining it centrally of the camera body including a pivoted shutter, spring means for urging the shutter in a direction to intercept the X-ray beam, but permitting the shutter to be moved out of the path of the beam upon insertion of the specimen holder.

3. An X-ray diffraction camera having in combination, a radiation confining body, means for permitting X rays to enter said camera body and for collimating said rays and defining a beam thereof, a holder for a specimen, a support for said holder for maintaining the specimen in such position that the X-ray beam shall pass therethrough to be diffracted thereby, an aperture in said camera body through which the diffracted X rays may pass, and a film retaining member for closing off said aperture and for maintaining a film in position over said aperture, and means interconnected with said support for moving it periodically throughout a predetermined angular extent thereby to oscillate the specimen within the X-ray beam as the diffraction pattern thereof is exposed on a film.

4. An X-ray diffraction camera having in combination, a radiation confining body, means for permitting X rays to enter said camera body and for collimating said rays and defining a beam thereof, a holder for a specimen, a support for said holder maintaining the specimen in such position that the X-ray beam shall pass therethrough to be diffracted thereby, an aperture in said camera body through which the diffracted X rays may pass, and a film retaining member for closing off said aperture and for maintaining a film in position over said aperture, and means including a motor for oscillating said support, the said motor being interconnected to the support through a cam and follower, the movement imparted by the cam to the follower being limited to a predetermined angular extent.

5. An X-ray diffraction camera having in combination, a radiation confining body, means for permitting X rays to enter said camera body and for collimating said rays and defining a beam thereof, a holder for a specimen and means for receiving said holder and specimen and for maintaining them in such position that the X-ray beam shall pass through the specimen to be diffracted thereby, an aperture in said camera body through which the diffracted X rays may pass, and a film retaining member for closing off said aperture and for maintaining a film in position over said aperture, guide means on said body and means on said film retaining member for cooperation with said guide means to permit it to slide relatively to the camera body thereby to position the retained film for making a number of independent, related exposures on said film, means for periodically moving said film retaining member and timing means for determining the length of independent exposures and for causing said means for moving the film retaining member to become active thereby to terminate an exposure and to advance the film for the next succeeding exposure.

6. An X-ray diffraction camera having in combination, a radiation confining body, means for permitting X rays to enter said camera body and for collimating said rays and defining a beam thereof, a holder for a specimen and means for receiving said holder and specimen and for maintaining them in such position that the X-ray beam shall pass through the specimen to be diffracted thereby, an aperture in said camera body through which the diffracted rays may pass, and a film retaining member for closing off said aperture and for maintaining a film in position over said aperture, guide means including a pair of channeled members attached to said camera body and having substantially greater length than the width of the body, splines projecting from said film retaining member and engaging within said channeled member thereby to permit ready movement of the film retaining member past the aperture in the camera body, a rack on said film retaining member and a claw engageable with teeth on said rack, a solenoid for actuating said claw to move the film retaining member thereby to advance the film from one exposure to the next, a timing means including a reversible synchronous motor, a timing disk driven by said motor, a switch and pins in said disk for actuating said switch, and a circuit variable by said switch for reversing the said motor and for energizing said solenoid when the film retaining member is to be moved incidental to terminating an exposure and advancing the film thereby to position it for the next succeeding exposure.

7. An X-ray diffraction camera having in combination, a radiation confining body, means for permitting X rays to enter said camera body and for collimating said rays and defining a beam thereof, a holder for a plurality of specimens and means for receiving said holder and specimens and for maintaining a specimen in such position that the X-ray beam shall pass through the specimen to be diffracted thereby, an aperture in said camera body through which the diffracted rays may pass, and a film retaining member for closing off said aperture and for maintaining a film in position over said aperture, the length of the film retaining member being several times the width of the aperture so that a series of independent, strip-like, adjacent X-ray exposures may be effected on a single sheet of film, said holder being of a length to accommodate a plurality of spaced specimens equal in number to the number of exposures provided by the length of the film retaining member and means for attaching said holder to said film retaining member so that the two move as a unit, guide means on said body and means on said film retaining member for cooperation with said guide means to permit it to slide relatively to the camera body thereby to position the retained film, and means for periodically moving said film retaining member and specimen holder, and timing means for determining the length of independent exposures and for causing said means for moving the film retaining member to become active thereby to terminate an exposure and to advance the film for the next succeeding exposure.

8. An X-ray diffraction camera having in combination, a radiation confining body, means for permitting X rays to enter said camera body, and for collimating said rays and defining a beam thereof, a holder for a plurality of specimens and means for receiving said holder and specimens and for maintaining a specimen in such position that the X-ray beam shall pass through the specimen to be diffracted thereby, an aperture in said camera body through which the diffracted X rays may pass, and a film retaining member for closing off said aperture and for maintaining a film in position over said aperture, the said film retaining member being of such length as compared to the width of the exposure aperture that a series of independent, strip-like, adjacent exposures may be effected on a sheet of film, said holder being of a length and having provision for retaining a number of specimens equal to the number of exposures to be produced on a single sheet of film, and means for closing said holder to move in synchronism with the film retaining member, guide means including a pair of channeled members attached to said camera body and having substantially greater length than the width of the body, splines projecting from said film retaining member and engaging within said channeled members thereby to permit ready movement of the film retaining member past the aperture in the camera body, a rack on said film retaining member having a plurality of teeth equal in number to the number of exposures to be made on a sheet of film, a claw engageable with teeth on said rack, a solenoid for actuating said claw to move the film retaining member thereby to advance the film from one exposure to the next, a timing means including a reversible synchronous motor, a timing disk driven by said motor, a toggle switch and pins in said disk for actuating said switch, and a circuit variable by said switch for reversing said motor and for energizing said solenoid when the film retaining member is to be moved for terminating an exposure and for advancing the film thereby to position it for the next succeeding exposure.

9. An X-ray diffraction camera for consecutive recording of diffraction patterns on a single sheet of film, comprising a camera body having an anterior, a posterior and side walls forming a radiation confining enclosure, guide means affixed to said anterior wall for the entry of radiation into said enclosure and collimating means therewithin to form a beam of said radiation, a holder for a sample to be subjected to said beam, means for supporting said holder within said enclosure in a fixed position and in proper alignment for the sample to intercept said beam, said posterior wall having an elongated aperture, a slidable film retaining member of a size several times larger than said aperture, means for retaining said member against said posterior wall and overlying said aperture and for moving said member past said aperture in discreet steps, whereby several diffraction patterns of samples placed in said holder may be taken in consecutive order upon the film in said member.

10. An X-ray diffraction camera for consecutive recording of diffraction patterns on a single sheet of film, comprising a camera body having an anterior, a posterior and side walls forming a radiation confining enclosure, guide means affixed to said anterior wall for the entry of radiation into said enclosure and collimating means therewithin to form a beam of said radiation, a holder for a sample to be subjected to said beam, means for supporting said holder within said enclosure in a fixed position and in proper alignment for the sample to intercept said beam, a releasable shutter member opaque to said radiation within said supporting means, said posterior wall having an elongated aperture, a slidable film retaining member of a size several times larger than said aperture, means for retaining said member against said posterior wall and overlying said aperture and for moving said member past said aperture in discreet steps, whereby several diffraction patterns of samples placed in said holder may be taken in consecutive order upon the film in said member.

11. An X-ray diffraction camera for consecutive recording of diffraction patterns on a single sheet of film, comprising a camera body having an anterior, a posterior and side walls forming a radiation confining enclosure, guide means affixed to said anterior wall for the entry of radiation into said enclosure and collimating means therewithin to form a beam of said radiation, a holder for a sample to be subjected to said beam, means for supporting said holder within said enclosure in a fixed position and in proper alignment for the sample to intercept said beam, a shutter opaque to said radiation affixed to said holder support, means for actuating said shutter into open position upon insertion of said holder and into closed position upon withdrawal of said holder, said posterior wall having an elongated aperture, a slidable film retaining member of a size several times larger than said aperture, means for retaining said member against said posterior wall and overlying said aperture and for moving said member past said aperture in discreet steps, whereby several diffraction patterns of samples placed in said holder may be taken in consecutive order upon the film in said member.

SIEGFRIED THEODORE GROSS.

REFERENCES CITED

The following references are of record in the file of this patent:

UNITED STATES PATENTS

| Number | Name | Date |
|---|---|---|
| 1,988,993 | Bouwers | Jan. 22, 1935 |
| 2,025,488 | Chu-Phay Yap | Dec. 24, 1935 |
| 2,317,329 | McLachlan, Jr. | Apr. 20, 1943 |
| 2,341,108 | McLachlan, Jr. | Feb. 8, 1944 |
| 2,347,638 | McLachlan, Jr. | Apr. 25, 1944 |
| 2,470,743 | Hochgesang et al. | May 17, 1949 |

OTHER REFERENCES

Structure of Metals, by C. S. Barrett, McGraw-Hill Book Co. (1943), pp. 109–111 (also pp. 163 and 165).